UNITED STATES PATENT OFFICE.

GEORGE W. BENDER, OF CANTON, OHIO.

ROOFING COMPOSITION.

SPECIFICATION forming part of Letters Patent No. 225,094, dated March 2, 1880.

Application filed December 17, 1879.

*To all whom it may concern:*

Be it known that I, GEORGE W. BENDER, of Canton, in the county of Stark and State of Ohio, have invented certain new and useful Improvements in Roofing Compositions; and I do hereby declare the following to be a full, clear, and exact description of the invention, such as will enable others skilled in the art to which it appertains to make and use the same.

This invention relates to an improved composition to be applied to shingles and other roof material for the purpose of rendering them water-proof, and also of straightening them, if bent or crooked, and retaining them in an even shape.

I have found that finely-comminuted iron ore and asphaltum, when mixed in proper portions and at a suitable degree of temperature, together with a sufficient quantity of coal-tar or gas-tar, enable me to overcome many of the difficulties I have met with in using the various compositions now known and employed for the protection of roofs and similar structures.
Many of the different iron ores are more or less suitable for my purpose; but I find that that which is known as the "black-band" iron ore is the best for the purposes of my improved roofing composition.
The proportions which I use substantially in forming my compound are as follows: One part of finely-pulverized iron ore, one part of asphaltum, and two parts of coal-tar. When applied it is heated to a high degree of temperature, and is then applied with a brush to the shingles or other surface to be coated with the compound.

It is well known that the shingles for roofing will, after a little exposure to the elements, warp, crack, and bend up, and be otherwise interfered with. I have found that by a proper application of the herein-described compound the shingles are so affected that they can be straightened, and that when the composition is applied to them they do not thereafter thus warp or bend, and that if the composition be applied to them when originally put in place it entirely prevents the warping and bending that usually occur.

In order to overcome these difficulties I have experimented with all of the compositions that I could obtain that have been hitherto in use, but have never found them to perform the desired work as completely or satisfactorily as the composition I have invented and above described.

The composition may be applied to fences, posts, and other similarly-exposed structures, and will result in a beneficial protection of them as well as of roofs, as above described.

I am well aware that the elements of my improved composition have been used separately in various other compositions for roofing, paving, manufacturing artificial stone, cement, &c., and do not wish to be understood as claiming any of these previous compositions as my invention; but I believe that I am the first to have used the ingredients above described in substantially the proportions named and applied in the manner and for the purposes cited.

What I claim as my invention is—

The herein-described roofing composition, consisting of finely-comminuted iron ore, asphaltum, and coal-tar, in substantially the proportions above named, and for the purposes set forth.

In testimony that I claim the foregoing I have hereunto set my hand this 6th day of December, 1879.

GEORGE W. BENDER.

Witnesses:
HENRY FISHER,
ABNER MCKINLEY.